United States Patent [19]

Shapiro et al.

[11] 4,196,468
[45] Apr. 1, 1980

[54] SERIES-TYPE INDEPENDENT INVERTER

[75] Inventors: Semen V. Shapiro; Leonid I. Gutin; Rinat N. Kiyamov; Viktor A. Okhotnikov; Ljubov E. Roginskaya; Vladimir G. Kazantsev; Vladimir E. Novichkov, all of Ufa, U.S.S.R.

[73] Assignee: Ufimsky Aviatsionny Institut, U.S.S.R.

[21] Appl. No.: 970,991

[22] Filed: Dec. 19, 1978

[51] Int. Cl.² .......................................... H02M 7/00
[52] U.S. Cl. .................................... 363/75; 363/136; 363/160
[58] Field of Search ............... 323/60; 363/75, 135, 363/136, 160, 170, 172, 173

[56] References Cited

FOREIGN PATENT DOCUMENTS

| | | |
|---|---|---|
| 251077 | 2/1970 | U.S.S.R. .................................. 363/136 |
| 463212 | 7/1975 | U.S.S.R. .................................. 363/136 |
| 525214 | 11/1976 | U.S.S.R. .................................. 363/136 |
| 547019 | 3/1977 | U.S.S.R. .................................. 363/136 |

*Primary Examiner*—William M. Shoop
*Attorney, Agent, or Firm*—Steinberg & Blake

[57] ABSTRACT

A series-type independent inverter comprising a bridge network that includes silicon controlled rectifiers, the bridge network having an a.c. diagonal provided with a circuit comprised of LC-elements, and having a d.c. diagonal provided with a coupling capacitor, and also comprising at least one uncontrolled semiconductor rectifier adapted to limit the voltage across the silicon controlled rectifiers. The inverter includes a saturated ferromagnetic element with a polarized magnetic circuit and with a primary winding inserted in the d.c. diagonal of the bridge network and adapted to form together with the latter a ferroresonance circuit, and also includes a filter tuned to a frequency that is a multiple of the input frequency of the saturated ferromagnetic element and connected to the secondary winding of the element.

2 Claims, 2 Drawing Figures

SERIES-TYPE INDEPENDENT INVERTER

FIELD OF THE INVENTION

The invention relates to semiconductor frequency changers, and more particularly to series-type independent inverters generating r.f. currents necessary for induction, ultrasonic and vibration installations which are utilized basically in metallurgical, aviation and chemical industries.

DESCRIPTION OF THE PRIOR ART

It is known that the dynamic properties of thyristors such as permissible rates of rise of current and voltage as well as the time of recovery of their control properties are responsible for the switching rate of thyristors. As a result, the corresponding limitation is imposed on the output voltage frequency of the existing inverters. At present, well-engineered thyristor inverters have the operating frequency range that extends to several tens of kilohertz only, while more higher frequencies are required for many production processes.

In the prior art series-type independent inverters the output frequency is increased by reducing the load of the thyristors incorporated in the inverter. To this end, damping, equalizing and other auxiliary circuits are provided or frequency multiplication is effected which is based on bridge and cell thyristor connection methods (cf. the USSR Inventor's Certificates Nos. 235,177, 547,019, 584,414, cl. H02M). As a result, the number of the required thyristors is increased, the installed power of the inverter capacitors and chokes is increased, and finally, the overall dimensions of the inverter are increased and its efficiency is decreased.

There is a series-type independent inverter (cf. the USSR Inventor3 s Certificate No. 300,934, cl. H02M), comprising a bridge network that includes silicon controlled rectifiers, the bridge network having an a.c. diagonal provided with a circuit comprised of LC-elements, and having a d.c. diagonal provided with a coupling capacitor, and also comprising at least one uncontrolled semiconductor rectifier adapted to limit the voltage across the silicon controlled rectifiers.

In this inverter, the voltage is limited by virtue of four uncontrolled semiconductor rectifiers which are in antiparallel relation to the silicon controlled rectifiers while the load is inserted in the d.c. diagonal in series with the coupling capacitor. The output voltage frequency is twice the turn-on frequency of the silicon controlled rectifiers (thyristors). Note that the period of variation of the load current corresponds to every operating half-cycle which is determined by the turn-on time for a pair of thyristors and uncontrolled semiconductor rectifiers (reverse-biased diodes).

In the described inverter, the output frequency is increased by a factor of 2 as a maximum as comprared to the thyristor turn-on frequency: this is due to the fact that the components of the inverter, except the bridge network, are linear ones. In addition, an increase in the output frequency, resulted from an increase in the thyristor turn-on frequency, causes a proportional decrease in the thyristor recovery time, a greater nonuniformity of the reverse voltages, and a lesser efficiency of the inverter. Connecting the load in series with the coupling capacitor results in a condition where the inverter operates normally only in certain limits of variation of the load resistance.

SUMMARY OF THE INVENTION

An object of the invention is to provide a series-type independent inverter having a greater frequency range of the output voltage.

Another object of the invention is to provide for normal operation of the inverter under conditions where the load resistance is varied from zero to infinity.

There is provided a series-type independent inverter comprising a bridge network that includes silicon controlled rectifiers, the bridge network having an a.c. diagonal provided with a circuit comprised of LC-elements, and having a d.c. diagonal provided with a coupling capacitor, which inverter also comprises at least one uncontrolled semiconductor rectifier adapted to limit the voltage across the silicon controlled rectifiers, there being provided, according to the invention, a main saturated ferromagnetic element with a polarized magnetic circuit, a primary winding of the main saturated ferromagnetic element being inserted in the d.c. diagonal of the bridge network in series with the coupling capacitor and being adapted to form together with the latter a ferroresonance circuit, and a filter tuned to a frequency that is a multiple of the input frequency of the main saturated ferromagnetic element and connected to a secondary winding of the latter.

Advantageously, the inverter should comprise at least one additional saturated ferromagnetic element with a polarized magnetic circuit, the additional saturated ferromagnetic element having a primary winding coupled in series with the primary winding of the main saturated ferromagnetic element, and having a secondary winding coupled in series opposition to the secondary winding of the main saturated ferromagnetic element, a filter being coupled to the secondary windings of the main and additional saturated ferromagnetic elements.

The inverter of the invention makes it possible to increase the output voltage frequency in wide limits, while maintaining its efficiency as well as the electrical parameters of its thyristors at a higher level. In addition, the inverter of the invention offers normal operation when the load resistance varies from zero to infinity.

DESCRIPTION OF THE DRAWINGS

The invention will now be described, by way of examples, with reference to the accompanying drawings, in which.

DESCRIPTION OF THE INVENTION

Figure 1:
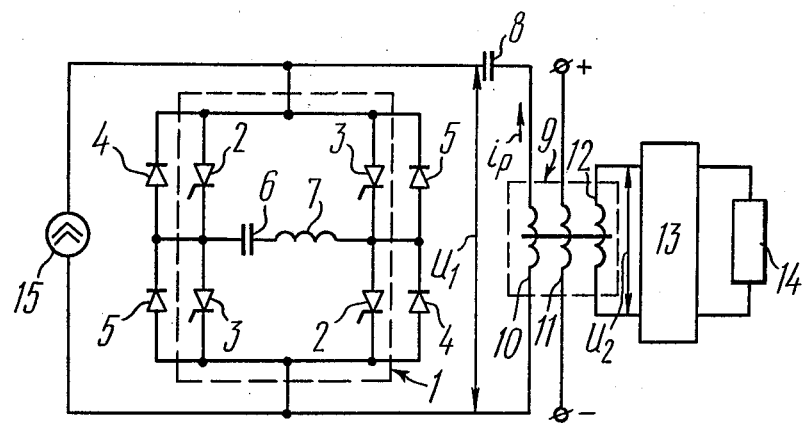
FIG. 1 is a circuit diagram of a series-type independent inverter having one saturated ferromagnetic element inserted in the d.c. diagonal of the thyristor bridge network, according to the invention.

The series-type independent inverter of the invention comprises a bridge network 1 (FIG. 1) that includes silicon controlled rectifiers 2, 3. In the given embodiment, the latter are shunted by semiconductor uncontrolled rectifiers 4, 5 with the result that the voltage across the rectifiers 2, 3 is limited. Inserted in the a.c. diagonal of the bridge network 1 is a circuit comprised of a capacitor 6 and a choke 7, thereby providing for a switching LC-circuit. A coupling capacitor 8 is connected in the d.c. diagonal of the bridge network 1.

There is a main saturated ferromagnetic element 9 having a polarized magnetic circuit and a primary winding 10 that is connected in series with the coupling capacitor 8 and is adapted to form together with the latter a ferroresonance circuit. The main saturated ferromagnetic element 9 includes a polarizing winding 11 fed from a d.c. sources and a secondary (output) winding 12 that connects to a filter 13 tuned to a frequency which is a multiple of the input frequency of the element 9. Any desirable band-pass filter can be used as the filter 13 (cf. the book entitled "Computation of Electric Filter" by Kislyakov I.S., "Energya" Publishers, Leningrad, 1967).

A load 14 is connected to the terminals of the filter 13. The inverter of the invention takes power from a current source 15.

Figure 2:
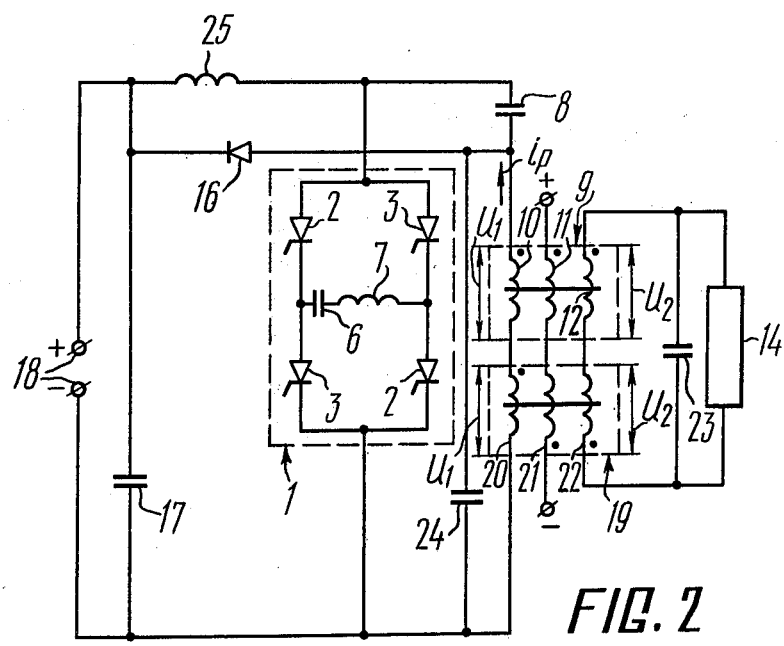
FIG. 2 is a circuit diagram of a series-type independent inverter having two saturated ferromagnetic elements inserted in the d.c. diagonal of the thyristor bridge network, according to the invention.

There is another embodiment of the inverter of the invention, which is generally similar to that described above. Here, a semiconductor uncontrolled rectifier 16 (FIG. 2) is used to limit the voltage across the controlled rectifiers 2, 3 of the bridge network 1. The rectifier 16 has its anode coupled to the connection point common to the coupling capacitor 8 and the primary winding 10 of the main saturated ferromagnetic element 9, and has cathode coupled to the positive plate of a capacitor 17 which is coupled to a d.c. voltage source 18.

In the described embodiment, there is at least one additional saturated ferromagnetic element 19 with a polarized magnetic circuit. The element 19 has a primary winding 20 coupled in series with the primary winding 10 of the element 9, and has a polarizing winding 21 and a secondary winding 22 coupled in series opposition to the polarizing winding 11 and the secondary winding 12, respectively, of the element 9. A filter analogous to the filter 13 (FIG. 1) can be employed in the described embodiment. That filter, however, can be merely a capacitor 23 (FIG. 2) connected to the secondary windings 12, 22 since the embodiment utilizes the additional element 19 and the windings 12, 22 are arranged in a series opposition. The parameters of the capacitor 23 are so selected that the frequency of the circuit comprised of the windings 12, 22 and the capacitor 23 will be a multiple of the input frequency of the elements 9, 19.

To compensate for the reactive power of the elements 9, 19 and the load 14, a capacitor 24 is coupled to the series-connected windings 10, 20 of the elements 9, 19. The inverter of the invention takes power from the d.c. voltage source 18 via a choke 25.

The inverter of the invention operates in the following manner. A control apparatus (not shown) operates to turn on one pair of the silicon controlled rectifiers 2 (FIG. 1) or 3 and the capacitor 6 in the a.c. diagonal of the bridge network 1 is recharged via a circuit comprised of the choke 7, coupling capacitor 8 and primary winding 10 of the saturated ferromagnetic element 9. At the moment when the current $i_p$ passing through the above-mentioned circuit in a direction shown by a respective arrow drops to zero a corresponding pair of the uncontrolled semiconductor rectifiers 4 or 5 is turned on. As a result, the voltage across the capacitor 9 is decreased down to a magnitude lesser than the voltage provided by the current source 15 and the current $i_p$ reverses its direction.

Therefore, the voltage across the ferroresonance circuit comprised of the coupling capacitor 8 and the primary winding 10 of the element 9 is a ripple one and the current passing through that circuit is an alternating current. When the current $i_p$ through the ferroresonance circuit assumes a certain magnitude, ferroresonance condition takes place. As the magnetic circuit of the element 9 reaches a saturated condition during the passage of the current $i_p$ through the primary winding 10 and the current through the polarizing winding 11, the voltage $U_1$ across the primary winding 10 and the voltage $U_2$ across the secondary winding 12 are actually nonsinusoidal ones since they involve a number of harmonics whose frequencies are multiples of the input frequency of the element 9 (the ferroresonance circuit). The required harmonic content is selected from the voltage $U_2$ by the filter 13 tuned to the frequency which is multiple of the input frequency of the element 9, and is applied to the load 14.

In the described embodiment, the output frequency of the inverter exceeds by several times the frequency of the voltage across the primary winding 10 of the element 9 at a constant turn-on time and a constant recovery time of the pairs of the rectifiers 2, 3.

Since a variable inductance component is present in the ferroresonance circuit, the rate of rise of current passing through the rectifiers 2, 3 during the turning-on of the latter can be limited. Since the efficiency of the element 9 has the value same as that of the linear elements of the circuitry, the inverter efficiency does not vary during frequency variation.

Since the internal resistance of the element 9 tends to vary by a factor of 2 as a maximum in changing the load resistance from infinity to zero, then the inverter of the invention operates normally from no-load to short circuit.

The second embodiment of the invention operates generally in a manner analogous to that of the first embodiment. When the voltage across the elements 9 (FIG. 2), 19 reaches a magnitude exceeding the voltage of the d.c. voltage source 18, the rectifier 16 is made conducting and the respective pair of rectifiers 2 or 3 stops conducting.

The elements 9, 19 operate on the principle that there results a compensation of their voltages which vary at a frequency equal to their input frequency. This compensation is effected due to the fact that the secondary windings 12, 22 and the polarizing windings 11, 21 are series-opposing ones. The advantage of the second embodiment is therefore that the capacitor 23 can act as a filter. The circuit formed by the capacitor 23 and the series-opposing windings 12, 22 is tuned to a frequency which is multiple of the input frequency of the elements 9, 19.

What is claimed is:

1. A series-type independent inverter, comprising:
    four silicon controlled rectifiers connected to constitute a bridge network;
    an a.c. diagonal and a d.c. diagonal of said bridge network;
    a circuit comprised of series-connected LC-elements and inserted in said a.c. diagonal of said bridge network;
    a coupling capacitor inserted in said d.c. diagonal of said bridge network;
    at least one uncontrolled semiconductor rectifier electrically coupled to said bridge network and adapted to limit the voltage across said silicon controlled rectifiers;
    a main saturated ferromagnetic element having a polarized magnetic circuit, a primary winding and a secondary winding and having said primary winding inserted in said d.c. diagonal of said bridge network in series with said coupling capacitor;

a ferroresonance circuit formed by said coupling capacitor and said primary winding of said main saturated ferromagnetic element;

a filter tuned to a frequency that is a multiple of the input frequency of said main saturated ferromagnetic element and connected to said secondary winding of said element.

2. An inverter as claimed in claim 1, comprising:

at least one additional saturated ferromagnetic element having a polarized magnetic circuit, a primary winding, and a secondary winding, having said primary winding coupled in series with said primary winding of said main saturated ferromagnetic element, and having said secondary winding connected in series opposition to said secondary winding of said main saturated ferromagnetic element;

said filter connected to said series-opposing secondary windings of said main and additional ferromagnetic elements.

* * * * *